United States Patent
Yamada

(10) Patent No.: US 7,733,546 B2
(45) Date of Patent: Jun. 8, 2010

(54) COLOR IMAGE PROCESSING APPARATUS

(75) Inventor: Kazuyuki Yamada, Fukushima (JP)

(73) Assignee: Oki Data Corporation, Tokyo (JP)

( * ) Notice: Subject to any disclaimer, the term of this patent is extended or adjusted under 35 U.S.C. 154(b) by 279 days.

(21) Appl. No.: 11/854,589

(22) Filed: Sep. 13, 2007

(65) Prior Publication Data

US 2008/0068662 A1 Mar. 20, 2008

(30) Foreign Application Priority Data

Sep. 15, 2006 (JP) .............................. 2006-251858

(51) Int. Cl.
- *G03F 3/08* (2006.01)
- *H04N 1/60* (2006.01)
- *H04N 1/403* (2006.01)
- *H04N 1/409* (2006.01)
- *G06K 9/00* (2006.01)

(52) U.S. Cl. .................... 358/518; 358/1.9; 358/2.1; 358/3.26; 358/523; 382/162; 382/165; 382/167

(58) Field of Classification Search ................ 358/518, 358/1.9, 504, 519, 520, 521, 522, 523, 512, 358/515, 525, 539, 2.1, 3.26; 382/192, 167, 382/165, 162

See application file for complete search history.

(56) References Cited

U.S. PATENT DOCUMENTS

| 5,838,465 | A | * | 11/1998 | Satou et al. | .................. 358/520 |
| 7,369,284 | B1 | * | 5/2008 | Inuzuka et al. | .............. 358/512 |
| 7,456,998 | B2 | * | 11/2008 | Nishikawa | .................. 358/1.9 |

FOREIGN PATENT DOCUMENTS

| JP | 2000-106628 A | 4/2000 |
| JP | 2001-328326 A | 11/2001 |
| JP | 2002-165104 A | 6/2002 |
| JP | 2002-211099 A | 7/2002 |
| JP | 2006-157807 A | 6/2006 |
| JP | 2006-165661 A | 6/2006 |

* cited by examiner

*Primary Examiner*—Charlotte M Baker
(74) *Attorney, Agent, or Firm*—Panitch Schwarze Belisario & Nadel LLP

(57) ABSTRACT

A color image processing apparatus capable of performing effective trapping process is provided. The apparatus processes color image data expressed by plural colors and comprises a drift information storing portion storing color drift information with respect to each of the plurality of colors; a boundary detecting portion detecting a boundary portion of the image data of the plural colors; a color change detecting portion detecting a color change in the boundary portion of the image data detected by the boundary detecting portion; a color drift direction recognizing portion recognizing a color drift direction with reference to the drift information storing portion according to the color change in the boundary portion detected by the color change detecting portion; and an image correcting portion correcting the color change in the boundary portion of the image data according to the color drift direction recognized by the color drift direction recognizing portion.

6 Claims, 20 Drawing Sheets

FIG.4

|  | Cyan | Magenta | Yellow | Black |
|---|---|---|---|---|
| Cyan | — | — | — | — |
| Magenta | Gh-cm | — | — | — |
| Yellow | Gh-yc | Gh-ym | — | — |
| Black | Gh-ck | Gh-mk | Gh-yk | — |

FIG.5

|  | Cyan | Magenta | Yellow | Black |
|---|---|---|---|---|
| Cyan | — | — | — | — |
| Magenta | Gv-cm | — | — | — |
| Yellow | Gv-yc | Gv-ym | — | — |
| Black | Gv-ck | Gv-mk | Gv-yk | — |

(a) CYAN PLAIN DATA (b) MAGENTA PLAIN DATA

TARGET PIXEL DATA
* YELLOW AND BLACK PIXELS ARE NOT SHOWN BECAUSE THERE ARE NO COLOR COMPONENTS (a) CYAN PLAIN DATA (b) MAGENTA PLAIN DATA

TARGET PIXEL DATA
* YELLOW AND BLACK PIXELS ARE NOT SHOWN
BECAUSE THERE ARE NO COLOR COMPONENTS (a) CYAN PLAIN DATA (b) MAGENTA PLAIN DATA

TARGET PIXEL DATA
* YELLOW AND BLACK PIXELS ARE NOT SHOWN
BECAUSE THERE ARE NO COLOR COMPONENTS (a) CYAN PLAIN DATA (b) MAGENTA PLAIN DATA

AREA EXPANDED BY TRAPPING PROCESS

IMAGE-CORRECTED AREA

(a) TRAP WIDTH : 0

(b) TRAP WIDTH : 1

(c) TRAP WIDTH : 2

(d) TRAP WIDTH : 3

CYAN(c)

MAGENTA(m)

YELLOW(y)

BLACK(k)

COLOR IMAGE PROCESSING APPARATUS

BACKGROUND OF THE INVENTION

1. Field of the Invention

The invention relates to a color image processing apparatus and, more particularly, to color drift correction in a color image.

2. Description of the Related Art

In a color printer as a color image processing apparatus, a plurality of printing mechanisms for printing images of different colors are arranged and printing is executed by using toner of cyan, magenta, yellow, and black. In such a color printer, since the images recorded by the toner of four colors are overlaid onto a record medium every color, a color drift is liable to occur. Ordinarily, the color drift of the printer occurs in the vertical or lateral direction of the record medium or in a state where the color drifts are combined in both of the vertical and lateral directions. Since the color drift occurs by various causes such as error of an attaching position of an LED head, variation in the image record medium, variation in conveying speed of the image record medium, rotational variation due to an eccentricity of a rotor, and the like, it is difficult to perfectly eliminate the color drift. Therefore, the color drifts which remain because they could not be eliminated are generally corrected by an image process called a trapping process. An outline of the trapping process will now be described with reference to the diagrams.

FIGS. 21A, 21B, and 21C are explanatory diagrams of the trapping process.

FIG. 21A is the diagram showing a state where a white-on-black portion has occurred due to the color drift. FIG. 21B is the diagram showing a state where a background area has been expanded by the trapping process. FIG. 21C is the diagram showing an area where the background expanded by the trapping process and an object have been overlaid. For example, it is assumed that the color drift of a dimension $\alpha$ occurred on the left side of an object (magenta) as shown in FIG. 21A. In such a case, to correct the color drift of the dimension $\alpha$, the area of the object (magenta) is unconditionally expanded in the whole circumference by $(\alpha+\Delta\alpha)$ as shown in FIG. 21B. (Refer to JP-A-2000-106628).

According to the conventional trapping process, the following problem to be solved remains. That is, even if the color drift of the printer occurred only in the lateral direction, by executing the trapping process, the overlapped area is also extended in the vertical direction where the correction is inherently unnecessary or extended to a portion where the overlap of the color images has already inherently existed due to the color drift.

SUMMARY OF THE INVENTION

It is an object of the invention to provide a color image processing apparatus suitable for making color drift correction in a color image.

It is another object of the invention to provide a color image processing apparatus which suppresses correction that is inherently unnecessary and which can execute an image process for enabling image recording of higher quality to be obtained.

According to the present invention, there is provided a color image processing apparatus for processing color image data expressed by a plurality of colors, comprising:

a drift information storing portion which stores color drift information with respect to each of the plurality of colors;

a boundary detecting portion which detects a boundary portion of the image data of the plurality of colors;

a color change detecting portion which detects a color change in the boundary portion of the image data detected by the boundary detecting portion;

a color drift direction recognizing portion which recognizes a color drift direction with reference to the drift information storing portion on the basis of the color change in the boundary portion detected by the color change detecting portion; and an image correcting portion which corrects the color change in the boundary portion of the image data on the basis of the color drift direction recognized by the color drift direction recognizing portion.

According to the invention, since the color image processing apparatus has the drift information storing portion for storing the color drift information and the color drift direction recognizing portion recognizes the color drift direction with reference to the drift information storing portion, the image correcting portion does not make the image correction with respect to the portion where there is no color drift. Therefore, such a situation that the unnecessary areas (for example, the upper and lower portions in FIGS. 21A to 21C) are corrected as in the conventional trapping technique is eliminated. Thus, such an effect that the image process which enables the image recording of higher quality to be obtained can be provided is obtained.

Other features and advantages of the present invention will be apparent from the following description taken in conjunction with the accompanying drawings, in which like reference characters designate the same or similar parts throughout the figures thereof.

BRIEF DESCRIPTION OF THE PREFERRED EMBODIMENTS

FIG. 4 is an explanatory diagram of a color drift table (horizontal direction);

FIG. 5 is an explanatory diagram of a color drift table (vertical direction);

DETAILED DESCRIPTION OF THE PREFERRED EMBODIMENTS

An image processing apparatus of the invention is constructed as follows.

Embodiment 1

Explanation of (Construction)

Figure 1:
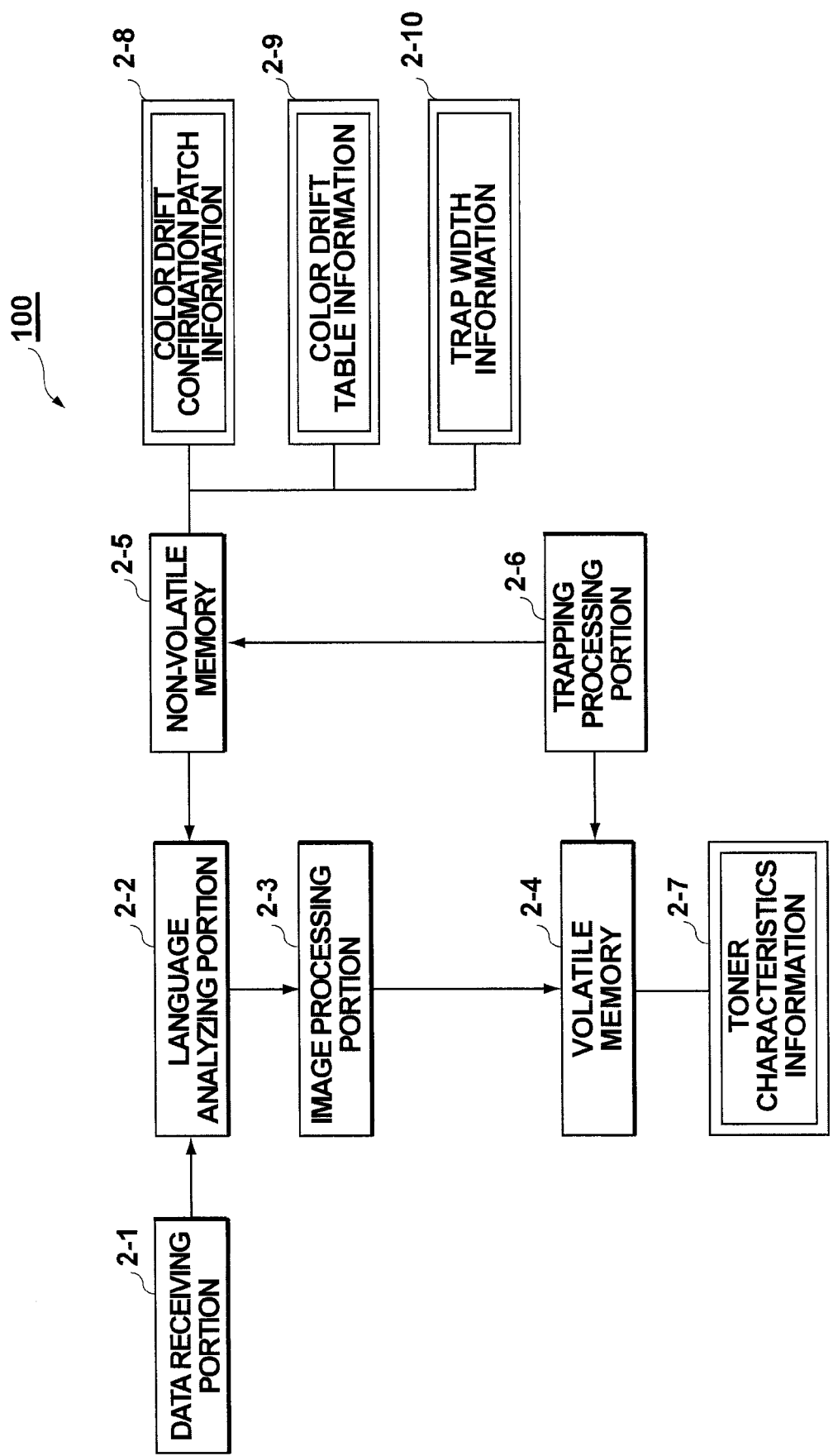
FIG. 1 is a functional block diagram showing a construction of a printing apparatus of an embodiment 1.

FIG. 1 is a functional block diagram showing a construction of a printing apparatus of an embodiment 1.

As shown in the diagram, a printing apparatus (hereinbelow, simply referred to as a printer) 100 in the embodiment 1 has a data receiving portion 2-1, a language analyzing portion 2-2, an image processing portion 2-3, a volatile memory 2-4, a non-volatile memory 2-5, and a trapping processing portion 2-6.

The data receiving portion 2-1 receives data which is transmitted from a network, an external apparatus, or the like (which are not shown). The language analyzing portion 2-2 analyzes the data received by the data receiving portion 2-1. The image processing portion 2-3 processes the data analyzed by the language analyzing portion 2-2 and forms raster data. The volatile memory 2-4 stores the raster data formed by the image processing portion 2-3 and toner characteristics information 2-7 of the printer. The toner characteristics information 2-7 is information showing concentration characteristics of toner held in the printer.

The non-volatile memory 2-5 stores color drift confirmation patch information 2-8, color drift table information 2-9, and trap width information 2-10. The color drift confirmation patch information 2-8 is reference job data to confirm a color drift in the printer. The color drift table information 2-9 is information showing the presence or absence and a direction of the color drift confirmed by the eyes on the basis of a color drift confirmation patch. The trap width information 2-10 is information showing a trap width. The trapping processing portion 2-6 executes a trapping process to the raster data formed by the image processing portion 2-3. The printer 100 described above operates as follows.

Explanation of (Operation)

First, an obtaining method of color drift performance of the printer 100 serving as a reference of the trapping process will be described.

Figure 2:
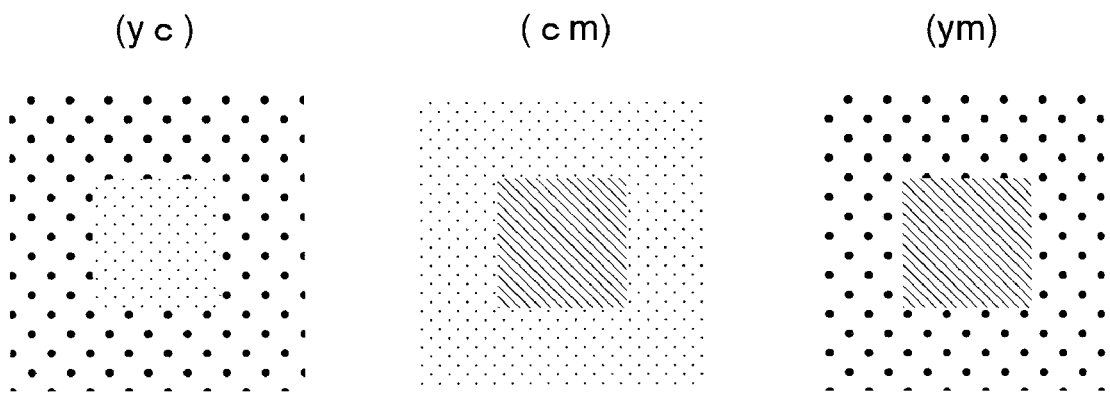
FIG. 2 is an explanatory diagram of color drift confirmation patches.
Figure 2:
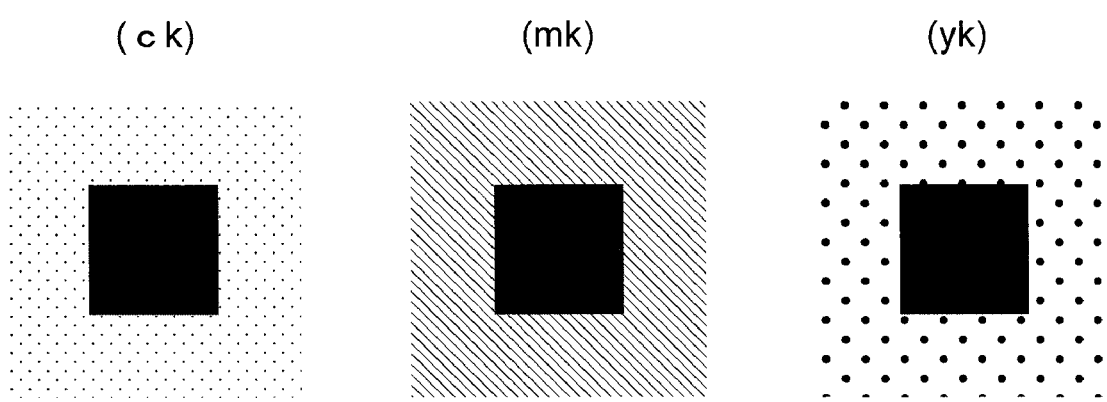
Figure 2:
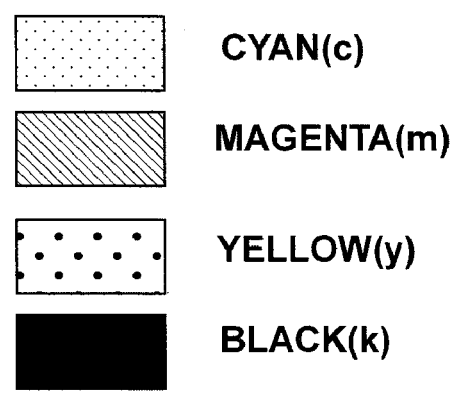

FIG. 2 is an explanatory diagram of the color drift confirmation patches.

This diagram illustrates a confirmation patch (yc), a confirmation patch (cm), a confirmation patch (ym), a confirmation patch (ck), a confirmation patch (mk), and a confirmation patch (yk) in each of which an inner frame of a square is enclosed in an outer frame of a square. Colors as a combination of two of the colors of cyan (c), magenta (m), yellow (y), and black (k) are displayed in the outer frame and the inner frame of each patch. In this instance, the color combination of yellow (y) in an outer frame and cyan (c) in an inner frame is displayed for the confirmation patch (yc). The color combination of cyan (c) in an outer frame and magenta (m) in an inner frame is displayed for the confirmation patch (cm). The color combination of yellow (y) in an outer frame and magenta (m) in an inner frame is displayed for the confirmation patch (ym). The color combination of cyan (c) in an outer frame and black (k) in an inner frame is displayed for the confirmation patch (ck). The color combination of magenta (m) in an outer frame and black (k) in an inner frame is displayed for the confirmation patch (mk). The color combination of yellow (y) in an outer frame and black (k) in an inner frame is displayed for the confirmation patch (yk). Since a confirmation patch (cy), a confirmation patch (mc), a confirmation patch (my), a confirmation patch (kc), a confirmation patch (km), and a confirmation patch (ky) (which are not shown) have the same functions as those of the confirmation patch (yc), confirmation patch (cm), confirmation patch (ym), confirmation patch (ck), confirmation patch (mk), and confirmation patch (yk), it is assumed that they are not included here. A portion of the inner frame of the square serving as an outer frame is a blank. Data to print those color drift confirmation patches has previously been stored as color drift confirmation patch information 2-8 in the non-volatile memory 2-5.

Figure 3:
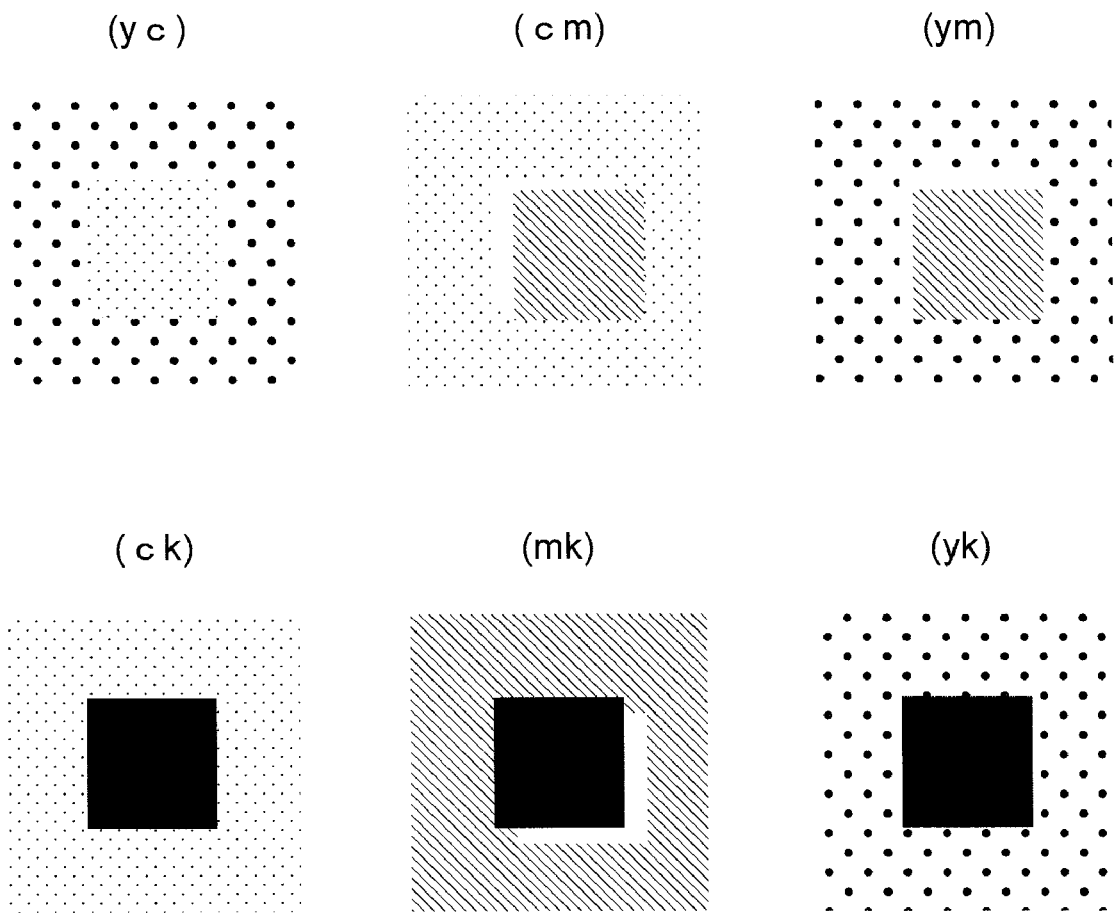
FIG. 3 is an explanatory diagram illustrating a state where the color drift confirmation patches in the embodiment 1 have been outputted by a printing apparatus 100.

FIG. 3 is an explanatory diagram illustrating a state where the color drift confirmation patches in the embodiment 1 have been outputted by the printer 100.

This diagram shows an example of a result obtained after the foregoing color drift confirmation patches shown in FIG. 2 were received from an upper apparatus (not shown) or the user designated the printing of the confirmation patches by operating switches on an operation panel (not shown) provided for the printer 100 and printed the confirmation patch data stored in the printer. In this example, it will be understood that, for instance, as shown in (mk), the color drift of black occurred at the top left position of magenta. By referring to the result of the patch printing, the user sets parameters into the color drift table information 2-9 stored in the non-volatile memory 2-5 (FIG. 1). The contents in the color drift table information 2-9 will be described.

FIG. 4 is an explanatory diagram of a color drift table (horizontal direction).

FIG. 5 is an explanatory diagram of a color drift table (vertical direction).

In the diagrams, cyan (c), magenta (m), yellow (y), and black (k) are shown in order from the left in a lateral frame and cyan (c), magenta (m), yellow (y), and black (k) are shown in order from the top in a vertical frame, respectively. A kind of confirmation patch is shown in a crossing frame of the lateral frame and the vertical frame. For example, in FIG. 4, "Gh–ym" is shown in the crossing frame of the fourth lateral frame from the top and the third vertical frame from the left. "Gh" denotes the patch for detection of the color drift in the horizontal direction. "ym" indicates the confirmation patch (ym) or the confirmation patch (my) (not shown). Therefore, the presence or absence of the drift in the horizontal direction of the confirmation patch (ym) and a sign (which will be explained hereinafter) of the direction are inserted as parameters in this frame. "my" denotes that since "m" is shown first, magenta corresponds to a background and yellow corresponds to an object.

Similarly, in FIG. 5, "Gv–ym" is shown in the crossing frame of the fourth lateral frame from the top and the third vertical frame from the left. "Gv" denotes the patch for detection of the color drift in the vertical direction. "ym" indicates the confirmation patch (ym) or the confirmation patch (my) (not shown). Therefore, the presence or absence of the drift in the vertical direction of the confirmation patch (ym) and a sign (which will be explained hereinafter) of the direction are inserted as parameters in this frame. Subsequently, a deciding method of the presence or absence of the drift in the horizontal direction and the sign of the direction and the presence or absence of the drift in the vertical direction and the sign of the direction will be described.

For example, when the print result of FIG. 3 is obtained, each parameter has the following sign.

*Gh–yc=0, Gh–cm=positive, Gh–ym=positive*

*Gh–ck=0, Gh–mk=negative, Gh–yk=0*

"Positive" denotes that the inner frame is deviated in the right direction, "negative" denotes that the inner frame is deviated in the left direction, and "0" denotes that there is no deviation (scanning direction).

*Gv–yc=0, Gv–cm=positive, Gv–ym=positive*

*Gv–ck=0, Gv≦mk=negative, Gv–yk=0*

"Positive" denotes that the inner frame is deviated in the lower direction, "negative" denotes that the inner frame is deviated in the upper direction, and "0" denotes that there is no deviation (sub-scanning direction).

The parameters obtained as mentioned above are set into the color drift tables as shown in FIGS. 4 and 5 by the operation of the operation panel of the printer which is executed by the operator or by a printer control command through the data receiving portion 2-1.

The pixel data will now be described.

Figure 6:
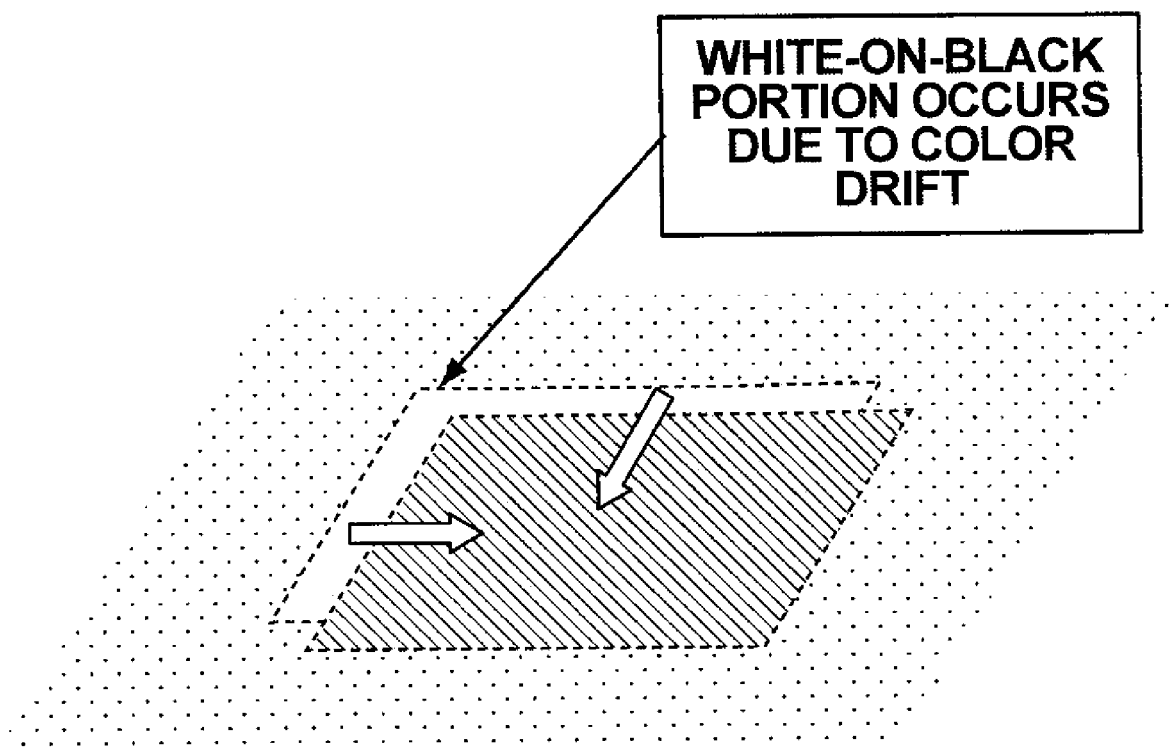
FIG. 6 is an explanatory diagram illustrating a state of color drifts of cyan and magenta.

FIG. 6 is an explanatory diagram illustrating a state of color drifts of cyan and magenta.

For example, it is now assumed that the color drift of magenta has occurred in the right and lower directions and the white-on-black portion has occurred as shown in the diagram.

Figure 7:
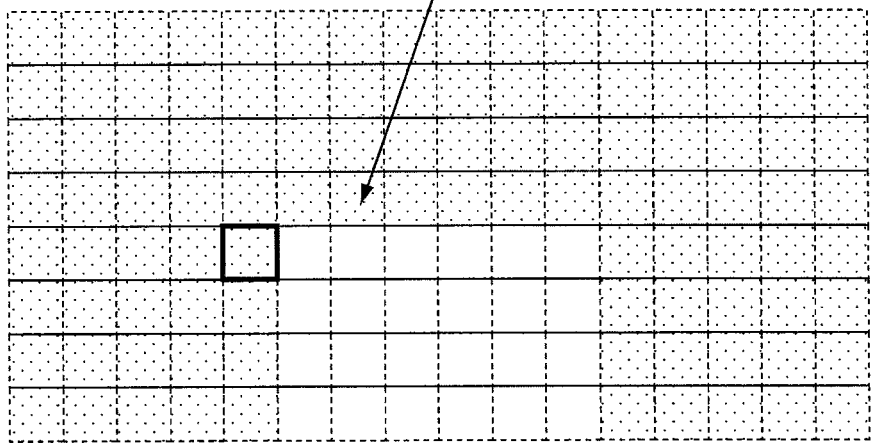
FIG. 7 is an explanatory diagram (part 1) of pixel data of cyan and magenta.
Figure 7:
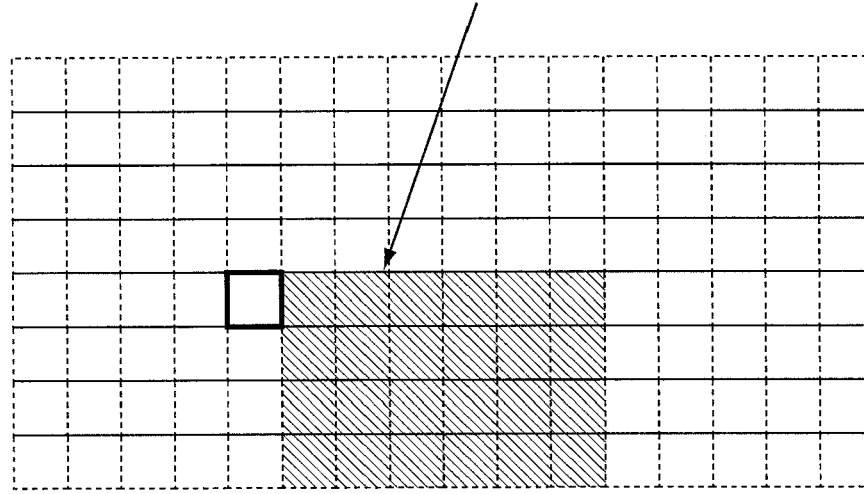
Figure 7:

FIG. 7 is an explanatory diagram (part 1) of pixel data of cyan and magenta.

Figure 8:
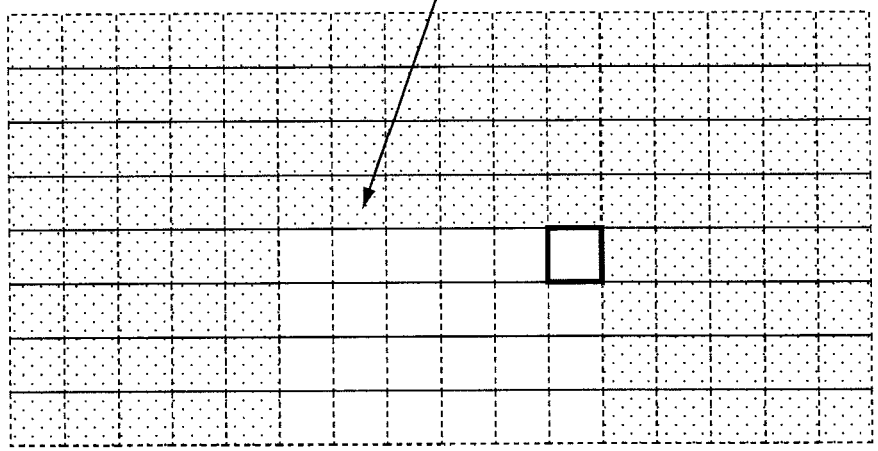
FIG. 8 is an explanatory diagram (part 2) of pixel data of cyan and magenta.
Figure 8:
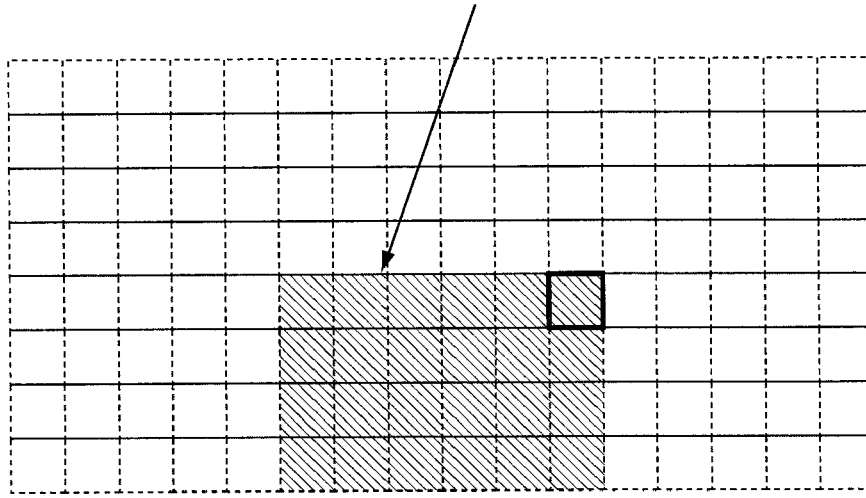
Figure 8:

FIG. 8 is an explanatory diagram (part 2) of pixel data of cyan and magenta.

Figure 9:
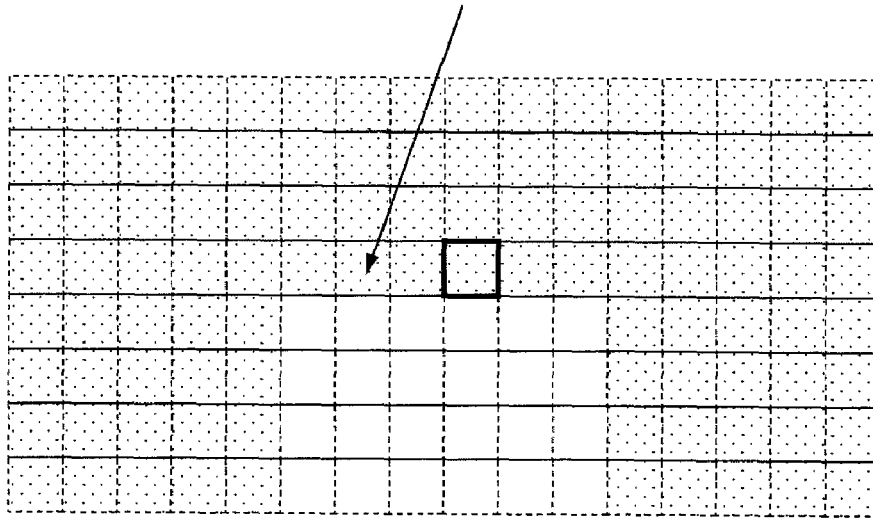
FIG. 9 is an explanatory diagram (part 3) of pixel data of cyan and magenta.
Figure 9:
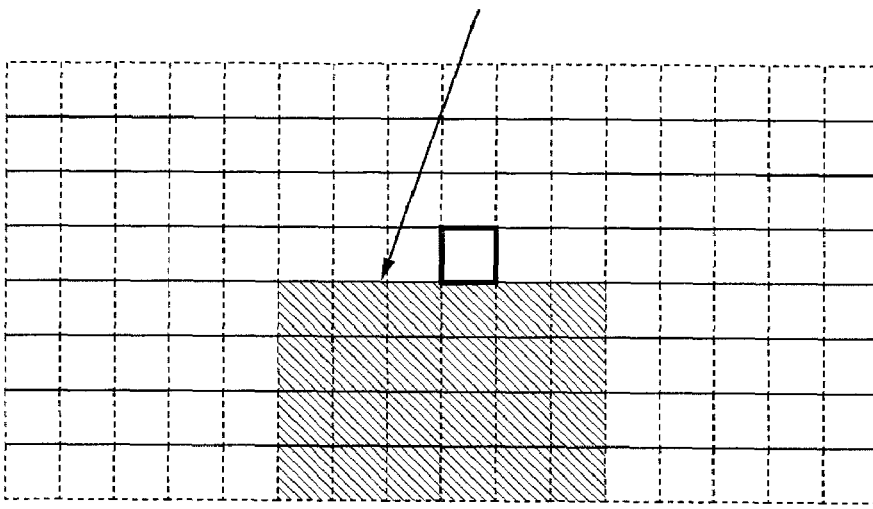
Figure 9:

FIG. 9 is an explanatory diagram (part 3) of pixel data of cyan and magenta.

Those diagrams show the pixel data of cyan and magenta, respectively. A case where the cyan object and the magenta object are neighboring as illustrated in the diagrams will be described here. The trapping process is executed to the raster data (bit map image data) formed in the image processing portion 2-3 (FIG. 1). This raster data is formed by the following method. The language analyzing portion 2-2 (FIG. 1) analyzes the data received by the data receiving portion 2-1 (FIG. 1) and the image processing portion 2-3 (FIG. 1) forms the raster data on the basis of a result of the analysis. The whole trapping process is divided into main flows (main outlines) and will be described hereinbelow also with reference to FIGS. 6 to 9 and, subsequently, details of each flow (main outline) will be described hereinbelow.

Figure 10:
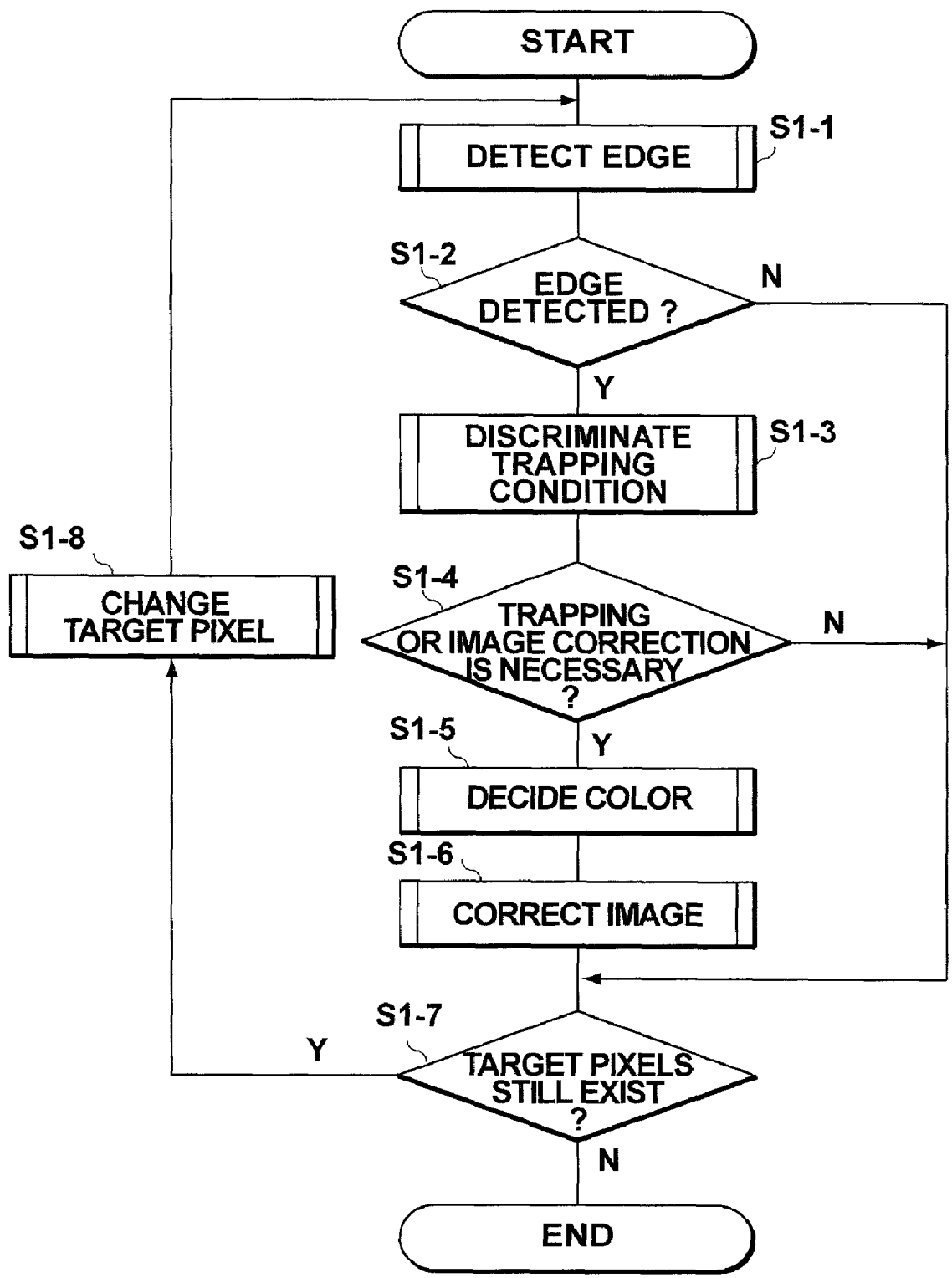
FIG. 10 is a flowchart for a trapping process in the embodiment 1.

FIG. 10 is a flowchart for the trapping process in the embodiment 1.

Step S1-1

First, the trapping processing portion 2-6 (FIG. 1) starts the detection of the edge from the raster data stored in the volatile memory 2-4 (FIG. 1). This processing flow will be described in detail again hereinafter.

Step S1-2

If the edge was detected, the processing routine advances to step S1-3. If the edge cannot be detected, step S1-7 follows.

Step S1-3

The trapping processing portion 2-6 (FIG. 1) discriminates about the necessity of the trapping process or the image correcting process on the basis of the color drift table information 2-9 (FIG. 1) and trap width information 2-10 (FIG. 1) stored in the non-volatile memory 2-5 (FIG. 1). This processing flow will be described in detail again hereinafter.

Step S1-4

If it is determined that the trapping process or the image correcting process is necessary, step S1-5 follows. If it is determined that the trapping process or the image correcting process is unnecessary, step S1-7 follows.

Step S1-5

The trapping processing portion 2-6 (FIG. 1) decides the color of the pixel. This processing flow will be described in detail again hereinafter.

Step S1-6

When the color of the pixel is decided, the trapping processing portion 2-6 (FIG. 1) corrects the image.

Step S1-7

Whether or not there are still target pixels is discriminated. If the target pixels exist, step S1-8 follows. If the processes regarding all pixels are finished in order from the top left position to the lower right position of the image, the printing is started.

Step S1-8

The target pixel is changed and the processing routine is returned to step S1-1.

Details of the edge detection shown in step S1-1 mentioned above will now be described.

Figure 11:
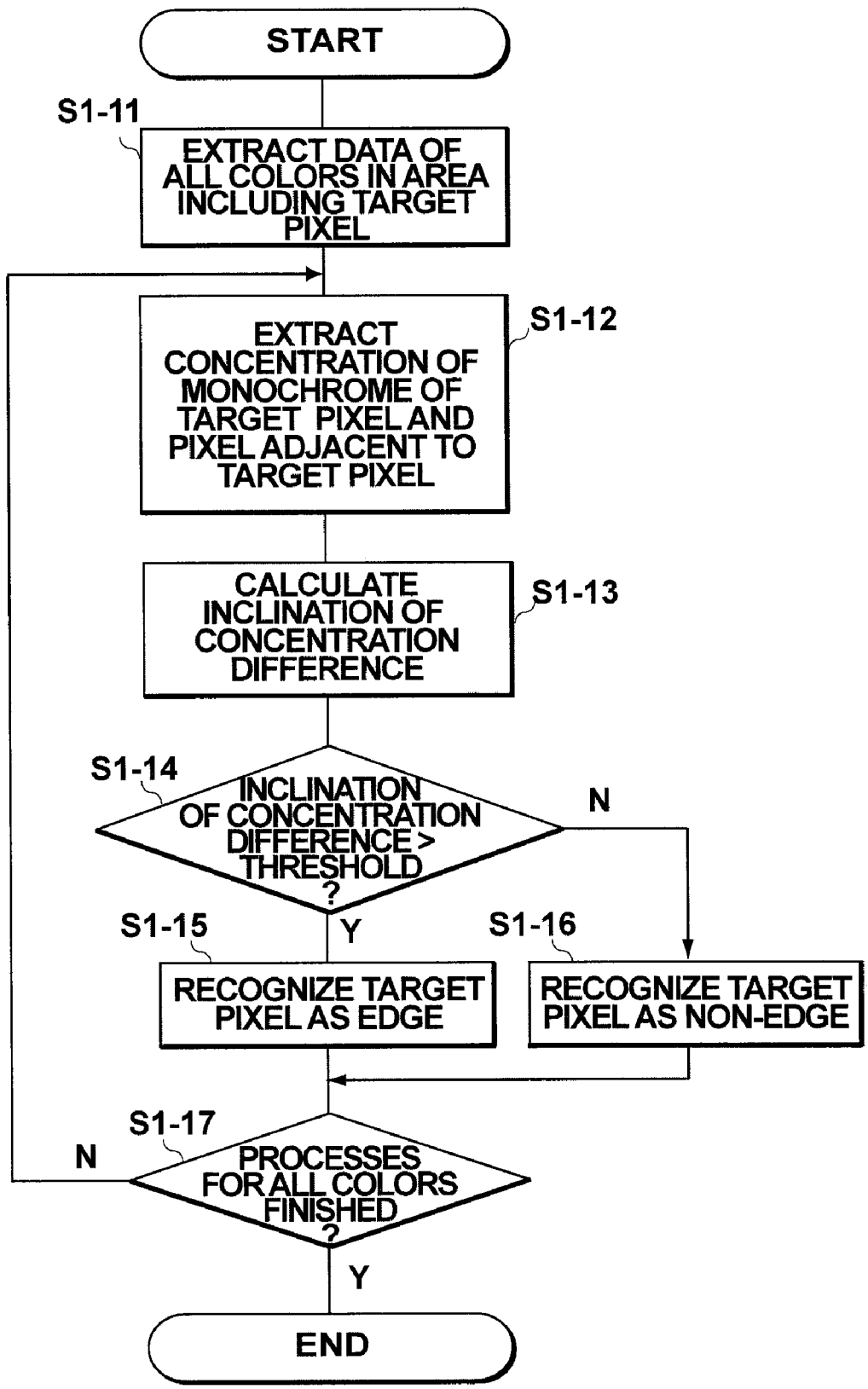
FIG. 11 is a flowchart for an edge detecting process.

FIG. 11 is a flowchart for the edge detecting process.

Step S1-11

The trapping processing portion 2-6 (FIG. 1) extracts the data of all colors in the area of one page including the target pixel as shown in FIGS. 6 to 9.

Step S1-12

The trapping processing portion 2-6 (FIG. 1) extracts concentration of the target pixel and concentration of the pixels which are adjacent to the target pixel in the right and lower directions. In this case, all concentration values of C, M, Y, and K are recognized.

Step S1-13

The trapping processing portion 2-6 (FIG. 1) calculates an inclination of a concentration difference. For example, when seeing cyan plain data in FIG. 7(*a*), the cyan concentration of the target pixel is equal to 80% and the concentration of the pixels which are adjacent to the target pixel in the right and lower directions are equal to 0% and 80%, respectively. The inclination of the concentration difference between the target pixel and the pixel in the right direction is equal to

[(concentration of the target pixel−concentration of the right−neighboring pixel)/(1−0)]=0.8.

Step S1-14

The concentration difference between the target pixel and the neighboring pixel is compared with a preset threshold value of the concentration difference for detecting the edge (for example, the threshold value is set to 0.5). If the inclination of the concentration difference exceeds the threshold value, step S1-15 follows. If the inclination does not exceed the threshold value, step S1-16 follows. In the example of FIG. 7(*a*), the processing routine advances to step S1-15.

Step S1-15

The trapping processing portion 2-6 (FIG. 1) determines that the target pixel is the edge.

Step S1-16

The trapping processing portion 2-6 (FIG. 1) determines that the target pixel is not the edge.

Step S1-17

Steps S1-12 to S1-17 are repeated until the processes are finished with respect to all colors of the target pixel. When the processes are finished with respect to all of the colors, the processing flow is finished. By executing the foregoing flow, the edge in the vertical direction is detected with respect to each of the target pixels in FIGS. 7 and 8. In the target pixel in FIG. 9, the edge in the lateral direction is detected.

Subsequently, details of the discrimination about the condition of the trapping process shown in step S1-3 mentioned above will be described.

Figure 12:
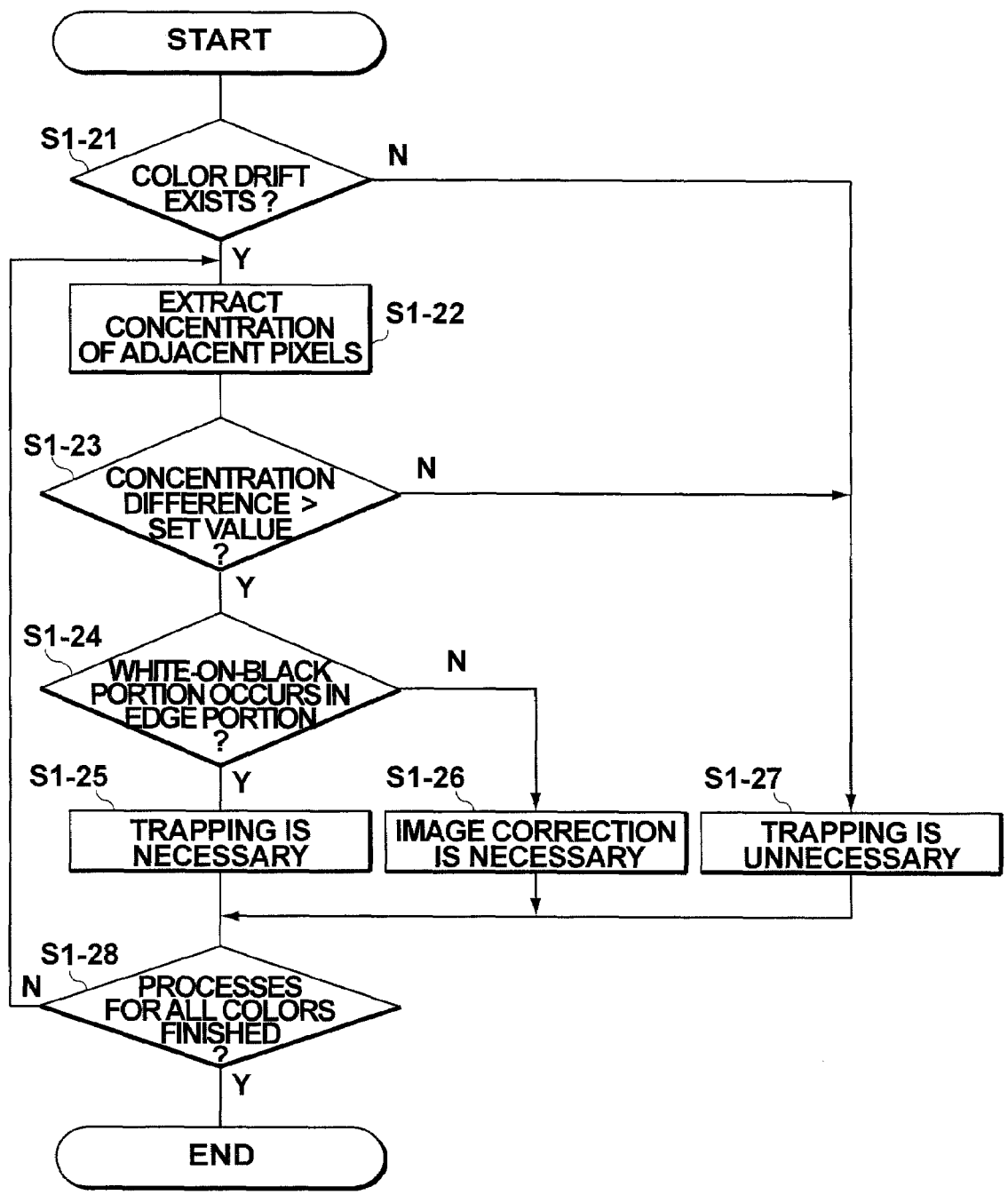
FIG. 12 is a flowchart for a trapping condition discrimination.

FIG. 12 is a flowchart for the trapping condition discrimination.

Step S1-21

The trapping processing portion 2-6 (FIG. 1) refers to the parameter values in the color drift tables in FIGS. 4 and 5. If all of the parameter values are not equal to "0", the trapping processing portion 2-6 (FIG. 1) determines that the color drift has occurred. If the color drift occurred, step S1-22 follows. If the color drift does not occur, step S1-27 follows.

Step S1-22

The trapping processing portion 2-6 (FIG. 1) extracts the concentration of the target pixel and the concentration of the pixels adjacent to the target pixel in the right and lower directions. In the case of FIG. 7, when seeing the cyan plain data, the cyan concentration of the target pixel is equal to 80% and the concentration of the pixels adjacent to the target pixel in the right and lower directions are equal to 0% and 80%, respectively.

Step S1-23

The trapping processing portion 2-6 (FIG. 1) compares the concentration difference between the target pixel and the neighboring pixel with the threshold value of the preset concentration difference adapted to apply the trapping process. If the concentration difference does not exceed the threshold value, step S1-27 follows. If the concentration difference exceeds the threshold value, step S1-24 follows.

Step S1-24

If a white-on-black portion occurred in the edge portion, step S1-25 follows. If no white-on-black portions occur, step S1-26 follows. In the case of FIG. 7, from the correspondence to FIGS. 4 and 5, the white-on-black portions ought to occur on the left and upper sides of the object (magenta) and overlap portions of the colors ought to occur on the right and lower sides of the object (magenta). That is, in the case of FIG. 7, since the concentration of cyan is equal to 80% and the concentration of magenta is equal to 100%, if cyan, magenta, yellow, and black are assumed to be −80, +100, 0, and 0, respectively, the concentration difference between the adjacent pixels increases from the left to the right. Therefore, the white-on-black portion occurs. Similarly, in the case of FIG. 8, from the correspondence to FIGS. 4 and 5, the overlap portions of the colors ought to occur on the right and lower sides of the object (magenta). That is, if cyan, magenta, yellow, and black are assumed to be +80, −100, 0, and 0, respectively, the concentration difference between the adjacent pixels decreases from the left to the right. Therefore, the overlap portion of the colors occurs.

Step S1-25

Since the white-on-black portion occurred in this edge portion, the trapping processing portion 2-6 (FIG. 1) determines that the trapping process is necessary (the case of FIG. 7 corresponds to this case).

Step S1-26

Since the overlap occurred in this edge portion, the trapping processing portion 2-6 (FIG. 1) determines that the image correcting process is necessary (the case of FIG. 8 corresponds to this case).

Step S1-27

Figure 21A:
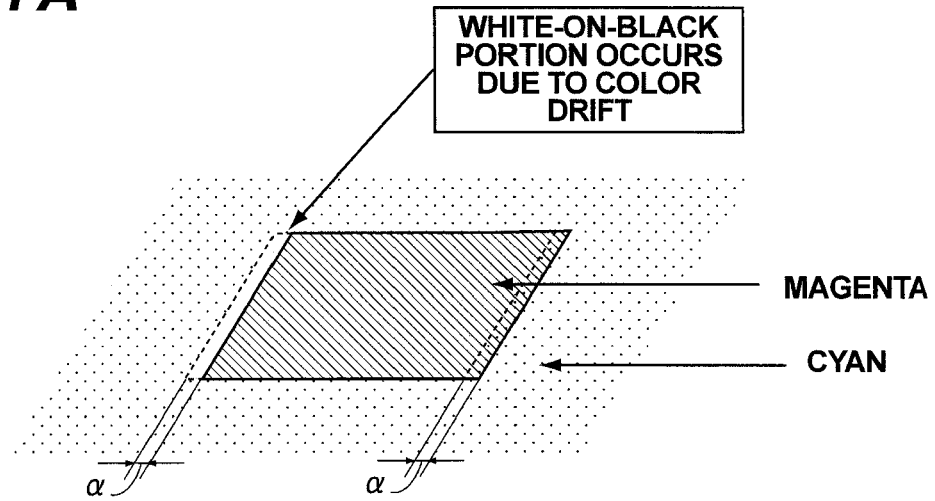
FIGS. 21A, 21B, and 21C are explanatory diagrams of the trapping process.
Figure 21B:
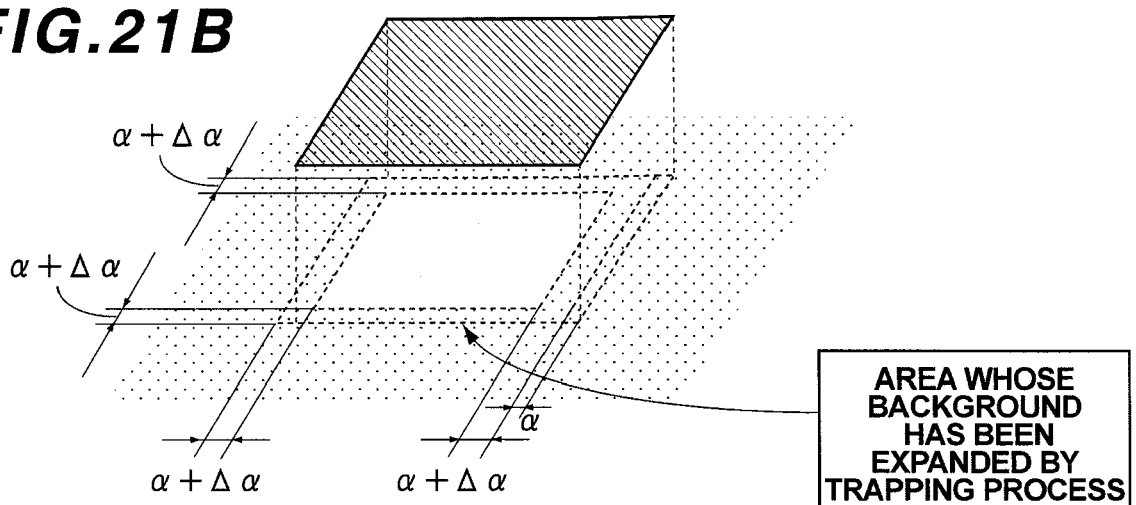
Figure 21C:
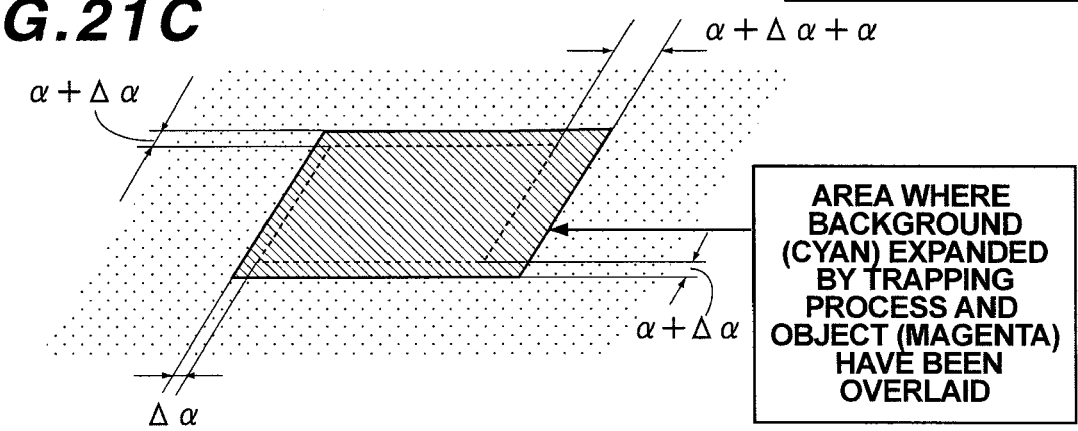

Since the trapping process is unnecessary, step S1-28 follows. Therefore, in the invention, the trapping process is unnecessary, for example, in the upper and lower portions and the like in FIGS. 21A to 21C.

Step S1-28

After the above processes were executed with respect to all of the pixels and colors, the processing flow is finished.

Details of the decision of the color shown in step S1-5 will now be described.

Figure 13:
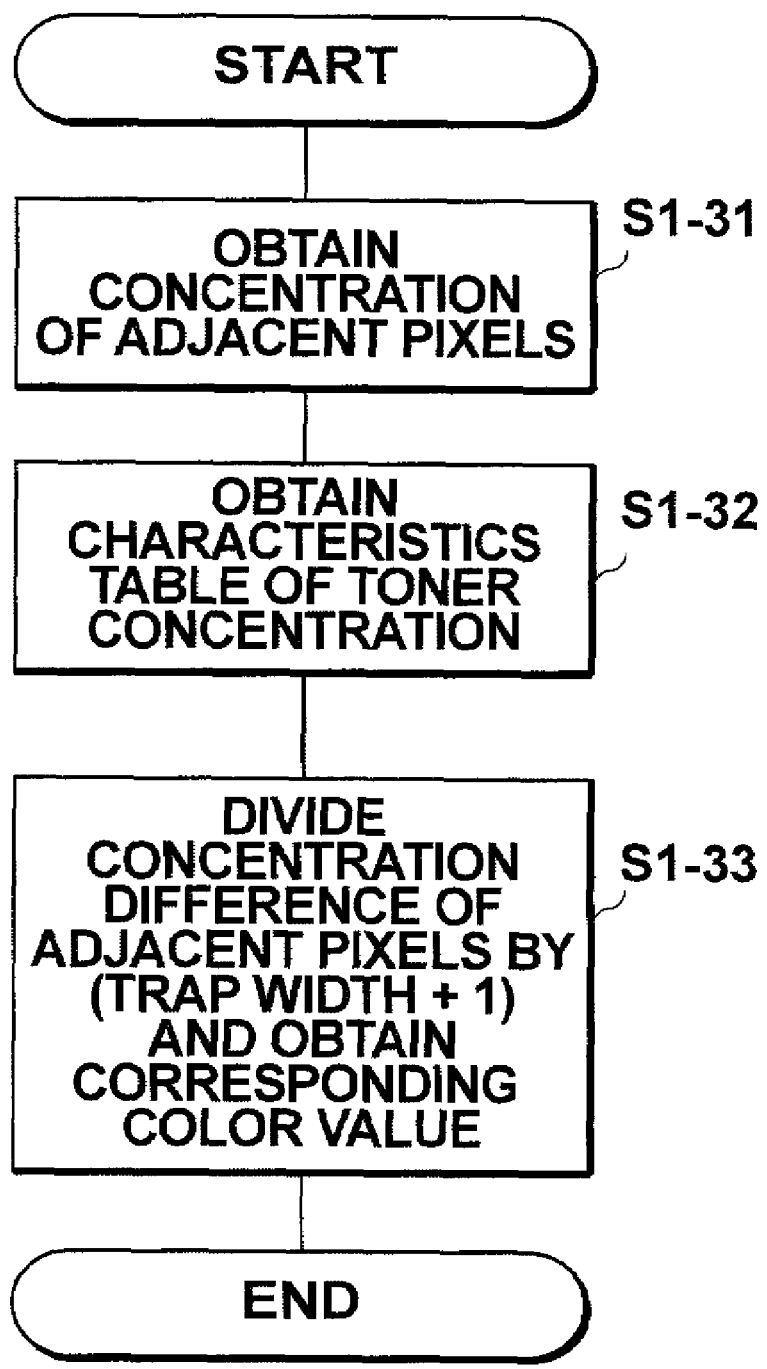
FIG. 13 is a flowchart for a color deciding process.

FIG. 13 is a flowchart for the color deciding process.

Step S1-31

The trapping processing portion 2-6 (FIG. 1) obtains the concentration of the target pixel and the concentration of the neighboring pixels. Since the color components to be expanded by the trapping are only the color component of cyan here, it is sufficient to obtain the concentration of only cyan.

Step S1-32

In the case of FIG. 7, the cyan concentration of the target pixel is equal to 80% and the concentration of each of the neighboring pixels is equal to 0%. The toner concentration characteristics will now be described.

Figure 14:
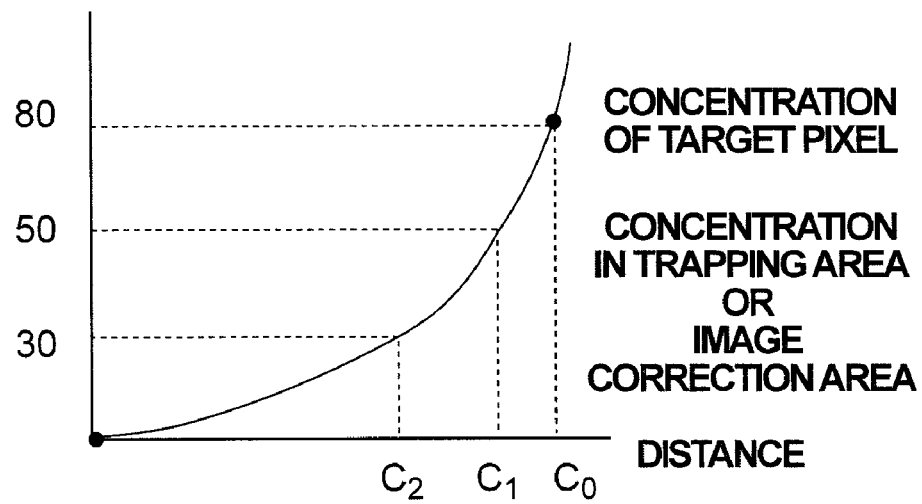
FIG. 14 is an explanatory diagram of toner characteristics.

FIG. 14 is an explanatory diagram of the toner characteristics.

FIG. 14 is a diagram for obtaining the concentration of the pixels in the trapping process or the image correcting process of the target pixel and the neighboring pixels. A distance from a predetermined reference position to a position C0 of the target pixel is shown in the X-axis direction in the diagram. In the diagram, C1 indicates a position of the pixel adjacent to the target pixel and C2 denotes a position of the pixel which is away from the target pixel by two pixels. The concentration corresponding to the distance to the position C0 of the target pixel is shown in the Y-axis direction in the diagram. It is now assumed that each of a trap width and an overlap width is equal to 2 dots and the concentration 80% of the target pixel is divided into (2+1), thereby obtaining C1 and C2. The concentration in C1 and that in C2 at that time have previously been stored as 50% and 30% in the non-volatile memory 2-5, respectively. However, those values are shown as an example. Each of the trap width and the overlap width is not limited to 2 dots and the trap width and the overlap width are not necessarily equal. The concentration values of each pixel in this case have also previously been stored in the non-volatile memory. By using this diagram, the concentration of the pixels in the trapping process or the image correcting process with respect to the target pixel and the neighboring pixels are obtained. In an embodiment 2, which will be described hereinafter, a case where they are not limited to such an example will be explained.

Returning to FIG. 13 again,

Step S1-33

For example, the trapping processing portion 2-6 (FIG. 1) obtains the cyan concentration 50% of the neighboring pixel (trap width of 1) and the cyan concentration 30% of the pixel (trap width of 2) of the second dot. The processing flow is finished. Those values have preliminarily determined by experimental values or the like and stored in the trap width information 2-10 (FIG. 1).

The image correction shown in step S1-6 mentioned above will now be described.

Figure 15:
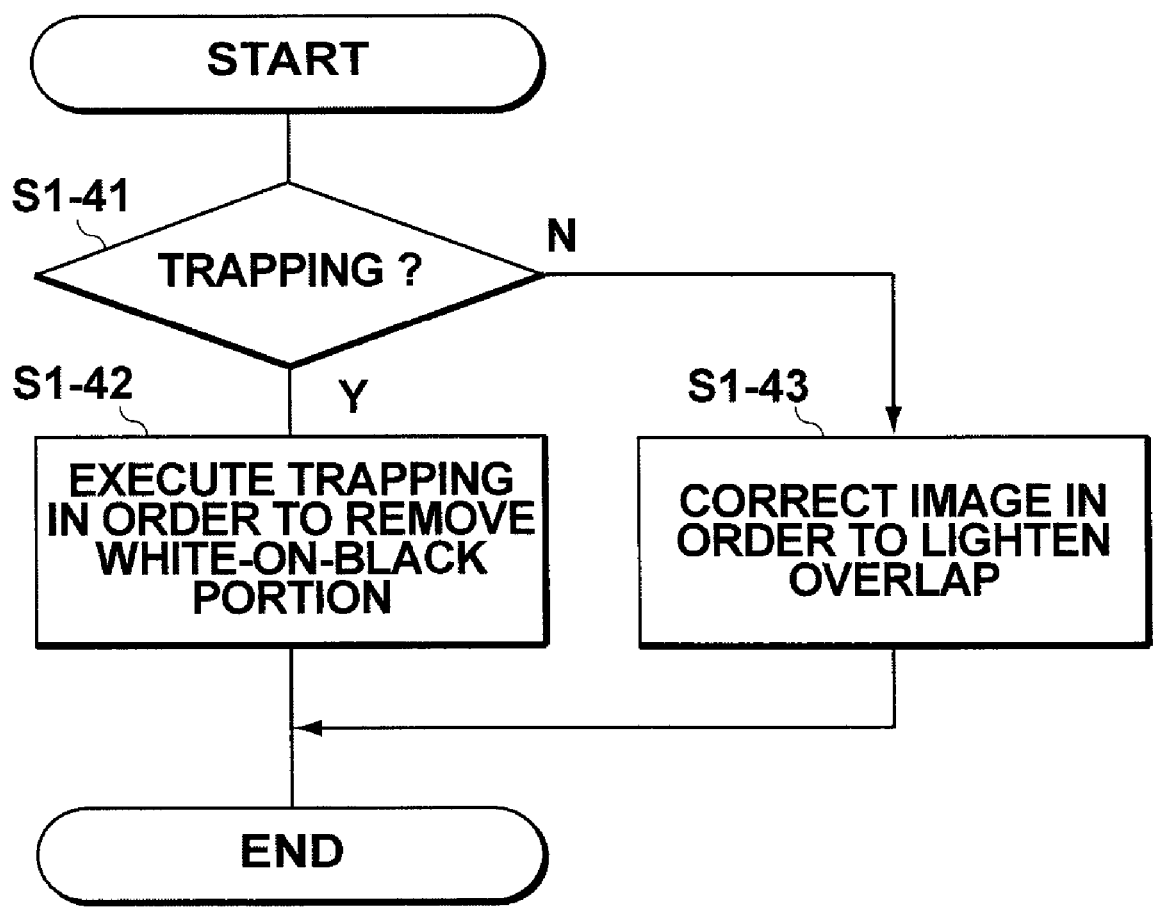
FIG. 15 is a flowchart for an image correcting process.

FIG. 15 is a flowchart for the image correcting process.

Step S1-41

If it is decided in step S1-25 (FIG. 12) that the trapping is necessary, step S1-42 follows. If it is decided that the trapping is unnecessary, step S1-43 follows.

Step S1-42

The trapping processing portion 2-6 (FIG. 1) removes the white-on-black portions by using the color values (C1 and C2 in FIG. 14) decided in step S1-33 for the pixel having the trap width (2 dots) in the trapping directions (left and upper). The processing flow is finished.

Step S1-43

The trapping processing portion 2-6 (FIG. 1) executes the image correcting process by using the color values (C1 and C2 in FIG. 14) decided in step S1-33 for the pixel having the trap width (2 dots) in the overlapping directions (right and lower). The processing flow is finished.

As described above, by starting with the target pixel from the top left position of the raster data, progressing in the right direction every line, and executing the image processes, the following results are obtained.

Figure 16:
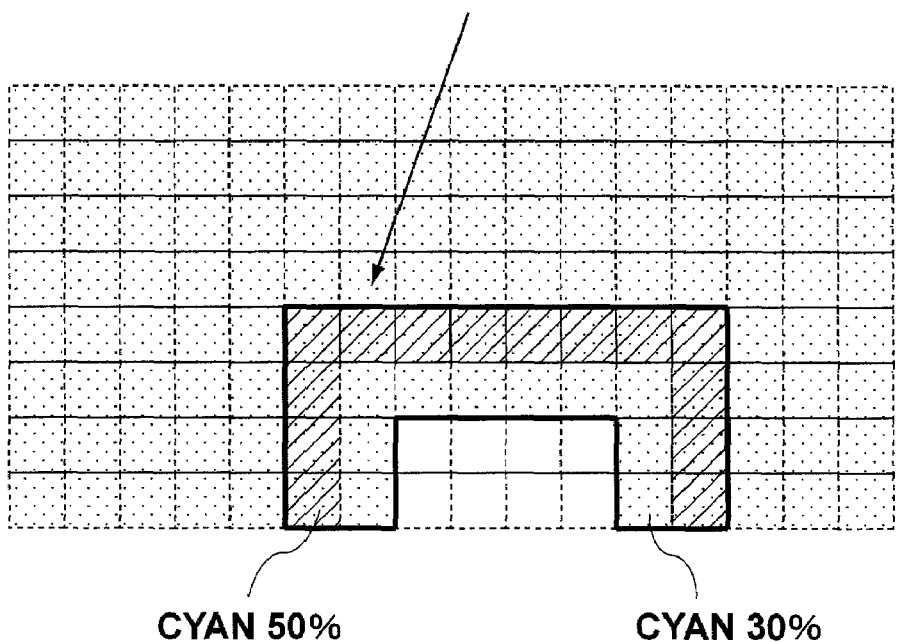
FIG. 16 is an explanatory diagram of a result of the image correction.
Figure 16:
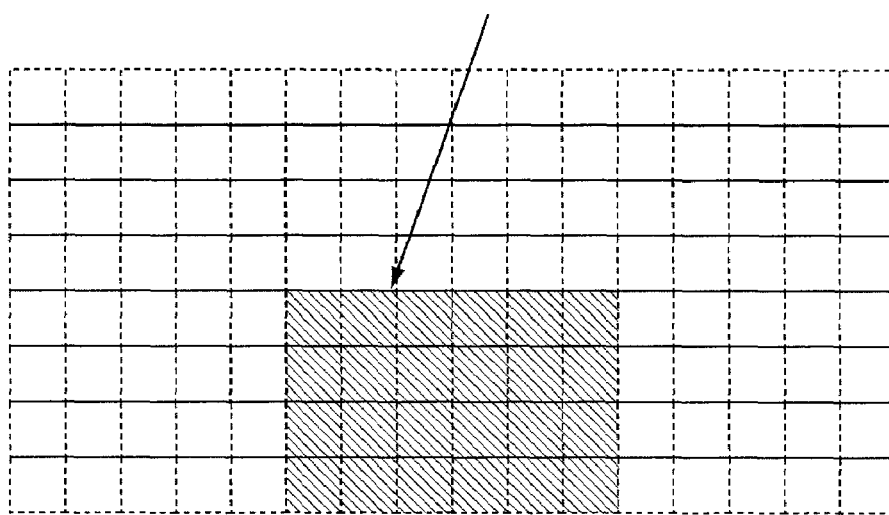
Figure 16:
Figure 16:

FIG. 16 is an explanatory diagram of the result of the image correction.

In (a), an inside surrounded by a bold solid line is a trapping-processed region. Further, a hatched portion indicates a region of cyan 50%. An inside surrounded by the hatched portion indicates a region of cyan 30%. The cyan plain data shown in (a) and the magenta plain data shown in (b) are overlaid, so that an output image is formed.

Although the case where the confirmation patch is expressed by one color in each of the inside of the outer frame of the square and the inside of the inner frame of the square has been described above, the invention is not limited to such an example. That is, for instance, in the confirmation patch (cm), yellow (y) can be also overlaid to magenta (m). In this case, a case where magenta (m) is deviated in the lower right direction from cyan (c) and yellow (y) is not deviated from cyan (c) is presumed. In such a case, since the white-on-black portion occurring between cyan (c) and magenta (m) is embedded by yellow (y), no white-on-black portions occur. Therefore, the correction is not made. For example, when yellow (y) is deviated from cyan (c) in the same direction as that of magenta (m), since the white-on-black portion occurs, the correction is made. It is preferable that the data to be corrected is the data in a data area of the lightest color (for example, yellow region) or the color area of a large area.

Explanation of (Effect)

As described above, according to the embodiment, such an effect that the white-on-black portion between the adjacent objects which occurs due to the color drift can be prevented or the color change due to the overlap of the objects can be lightened is obtained. By preliminarily providing the set values for the concentration difference between the adjacent pixels, such an effect that the necessity of the correction of the unnecessary areas (for example, the upper portion and the lower portion in FIGS. 21A to 21C) which has been made in the conventional trapping technique is eliminated is obtained. The image correcting portion discriminates the white-on-black portion and the color overlap portion on the basis of the direction of the color drift, executes the color embedding process to the white-on-black portion, and executes the color eliminating process to the color overlap portion. Thus, such an effect that the image process which enables the image recording of higher quality to be obtained can be provided is obtained.

Embodiment 2

Explanation of (Construction)

Figure 17:
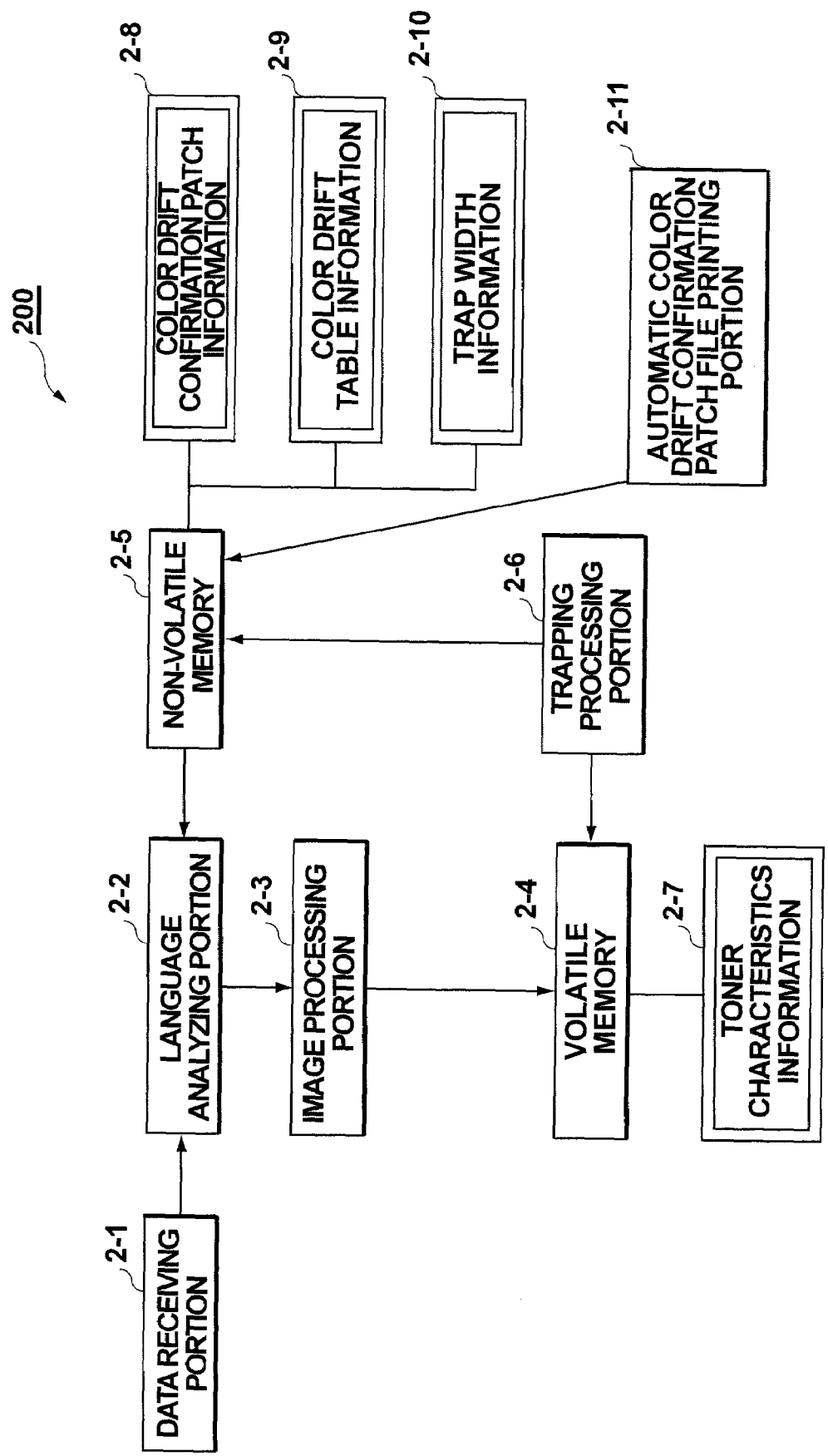
FIG. 17 is a functional block diagram showing a construction of a printing apparatus (printer) of an embodiment 2.

FIG. 17 is a functional block diagram showing a construction of a printing apparatus of an embodiment 2.

As shown in the diagram, a printing apparatus (printer) 200 of the embodiment 2 has the data receiving portion 2-1, the language analyzing portion 2-2, the image processing portion 2-3, the volatile memory 2-4, the non-volatile memory 2-5, the trapping processing portion 2-6, and an automatic color drift confirmation patch file printing portion 2-11. Only the portions different from the embodiment 1 will be described hereinbelow. The portions similar to those in the embodiment 1 are designated by the same reference numerals as those in the embodiment 1 and their overlap explanation is omitted here.

The automatic color drift confirmation patch file printing portion 2-11 has such functions that the set values in the trap width information 2-10 are changed and the color drift confirmation patch information 2-8 can be inputted into the language analyzing portion 2-2 a plurality of number of times.

Explanation of (Operation)

In the embodiment 1, the trap width in the printer has been set based on the decision of the user. In other words, to decide the trap width, the patch printing is executed and the trap width of the main body is presumed by the eyes and set into the printer. Naturally, there is also a case where the trap width is too small or, contrarily, too large. Such a trap width deciding process has to be executed several times until the proper trap width is determined. The embodiment 2 provides a method whereby upon patch printing, the trap width is automatically changed and the image process is executed, so that the user can more easily and properly decide the trap width.

Figure 18:
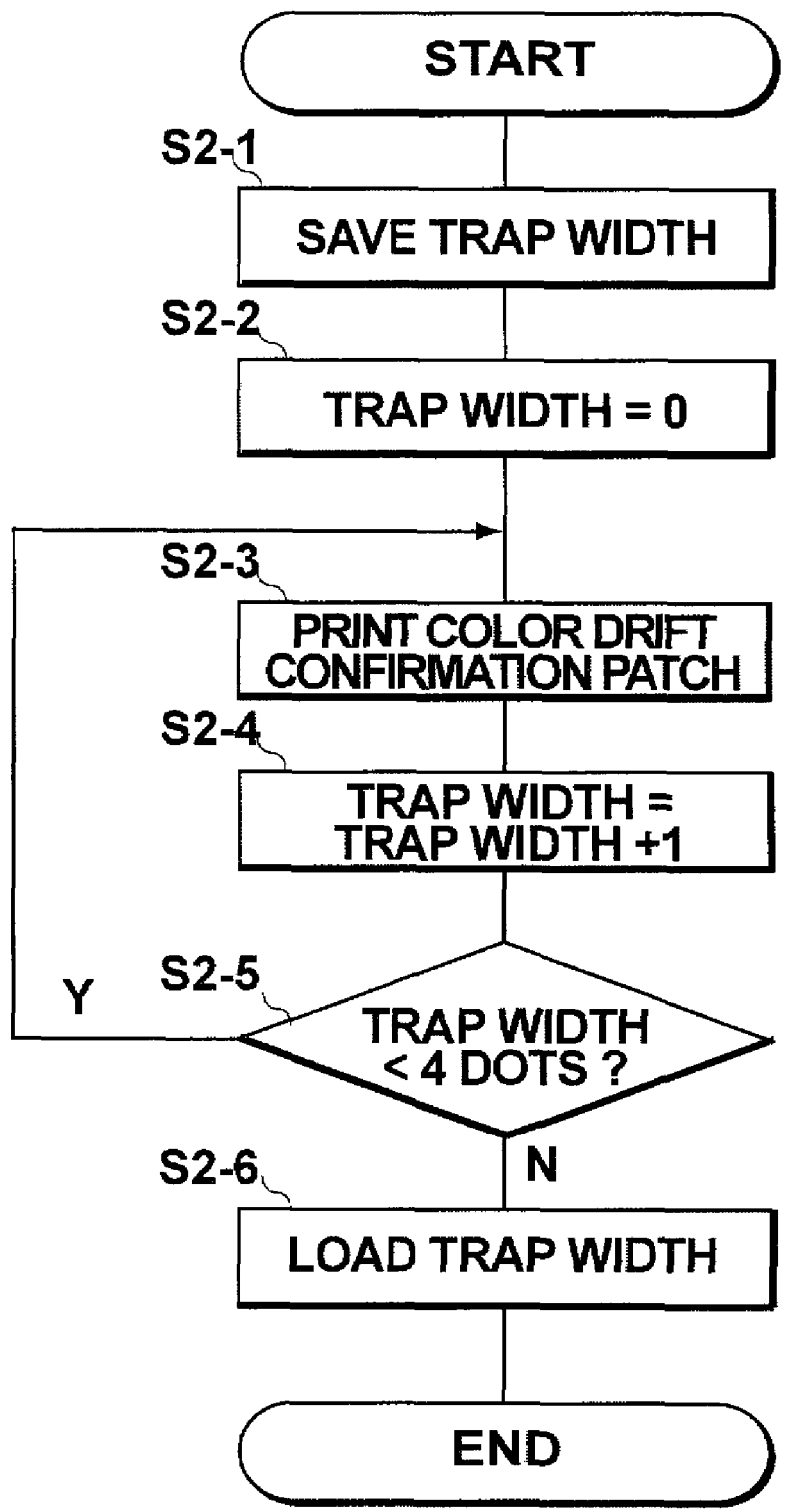
FIG. 18 is a flowchart for color drift confirmation patch printing in the embodiment 2.

FIG. 18 is a flowchart for the color drift confirmation patch printing in the embodiment 2.

The operation of the embodiment 2 will now be described with reference to the flowchart. In the description, the following diagrams are also referred to.

Figure 19:
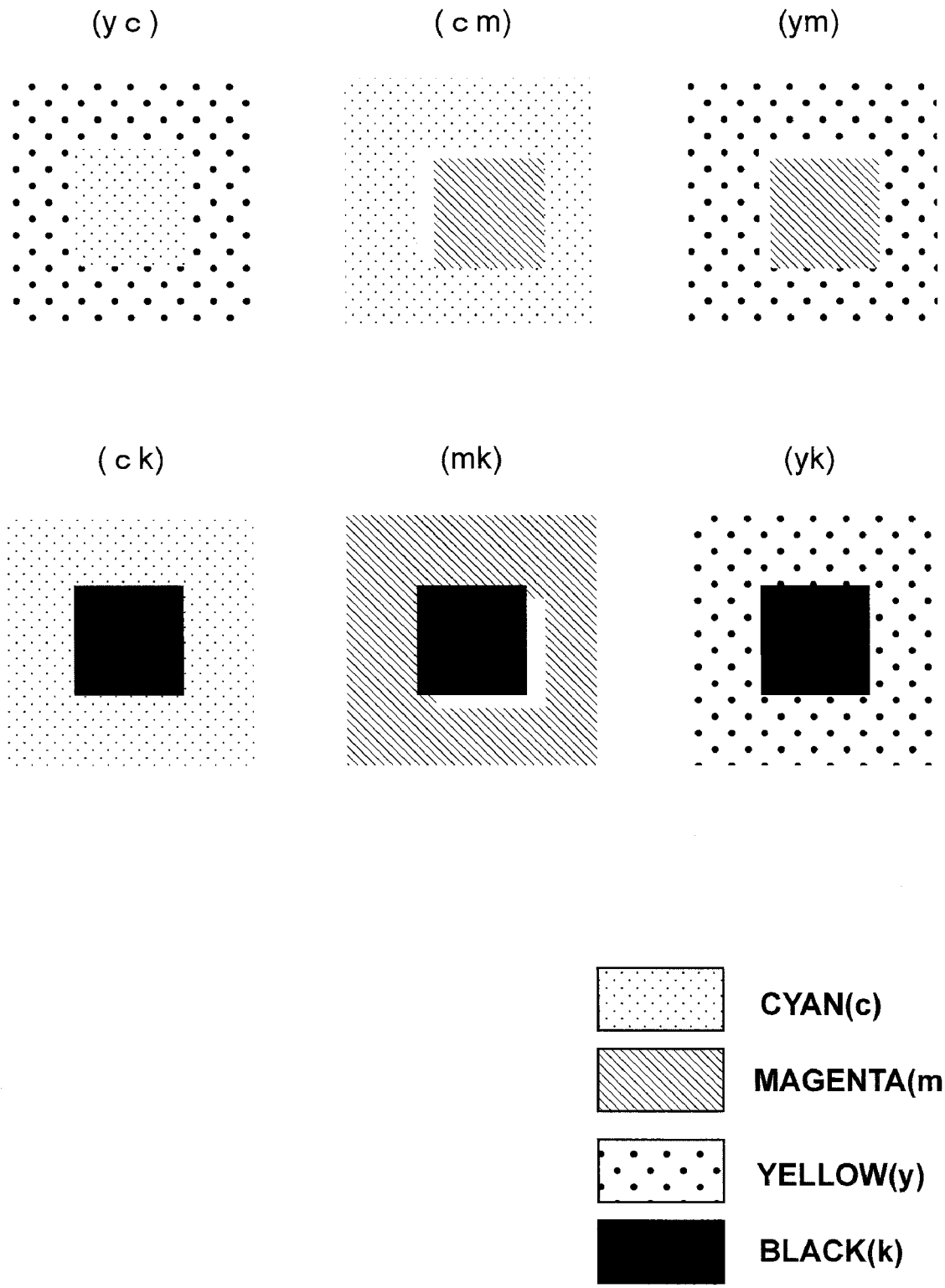
FIG. 19 is an output explanatory diagram (part 1) of the color drift confirmation patches in the embodiment 2.

FIG. 19 is an output explanatory diagram (part 1) of the color drift confirmation patches in the embodiment 2.

This diagram illustrates the state of (the trap width=0) and is substantially the same as FIG. 3 in the embodiment 1.

Figure 20:
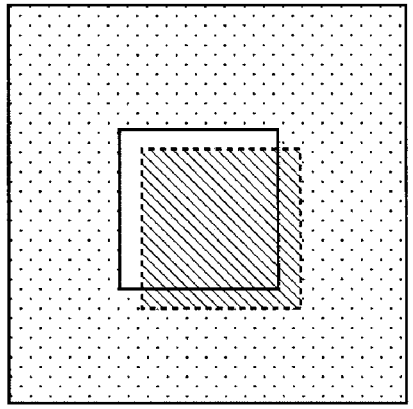
FIG. 20 is an output explanatory diagram (part 2) of the color drift confirmation patches in the embodiment 2.
Figure 20:
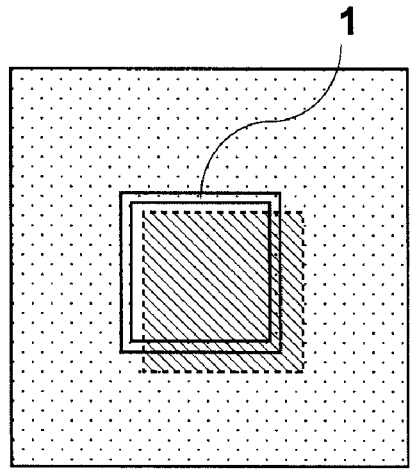
Figure 20:
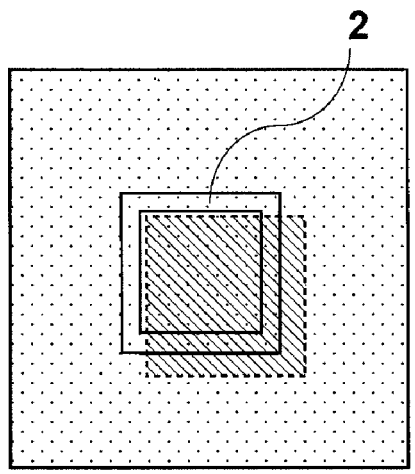
Figure 20:
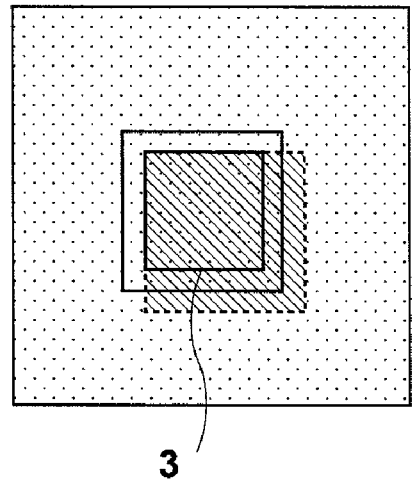
Figure 20:
Figure 20:
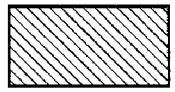
Figure 20:
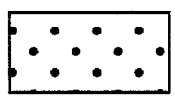
Figure 20:

FIG. 20 is an output explanatory diagram (part 2) of the color drift confirmation patches in the embodiment 2.

This diagram shows the case where the trap width of the confirmation patch (cm) in FIG. 19 has been changed.

First, to confirm the color drift of the printer, the color drift confirmation patches are printed. It is sufficient for the user to print the color drift confirmation patches in a manner similar to the embodiment 1. After that, the automatic color drift confirmation patch file printing portion 2-11 (FIG. 17) prints a plurality of patch files while changing the setting of the trap width.

Step S2-1

The automatic color drift confirmation patch file printing portion 2-11 (FIG. 17) saves the current trap width set in the printer into the volatile memory.

Step S2-2

The automatic color drift confirmation patch file printing portion 2-11 (FIG. 17) sets the trap width of the printer to "0".

Step S2-3

The automatic color drift confirmation patch file printing portion 2-11 (FIG. 17) prints the color drift confirmation patches stored in the non-volatile memory. The trapping process is never executed here.

Step S2-4

The automatic color drift confirmation patch file printing portion 2-11 (FIG. 17) adds "1" to the setting of the trap width of the printer.

Step S2-5

The automatic color drift confirmation patch file printing portion 2-11 (FIG. 17) discriminates whether or not the trap width is smaller than 4 dots. If it is smaller than 4 dots, the processing routine is returned to step S2-3 and the color drift confirmation patches are printed. Although the threshold value which is used to discriminate the trap width has been set to 4 dots for convenience of explanation, it may be set to a value which is larger or smaller than 4 dots.

Step S2-6

The automatic color drift confirmation patch file printing portion 2-11 (FIG. 17) sets the trap width. When steps S2-1 to S2-6 are completed, the total four output results are obtained.

FIG. 20 is an output explanatory diagram (part 2) of the color drift confirmation patches in the embodiment 2.

This diagram illustrates a state obtained by paying an attention only to the confirmation patch (cm) in FIG. 19 and is a diagram in the case where the trap width is changed. Output results are obtained on the assumption that the trap width is set to 0 dot, 1 dot, 2 dots, and 3 dots, respectively. The user decides the best or desired trap width from those print results and sets the selected trap width into the printer.

The trap width can be also inputted every color combination here. Since the specific image processes are similar to those in the embodiment 1, their overlapped explanation is omitted here.

Explanation of (Effects)

In addition to the effects in the embodiment 1, such an effect that the user can easily select the proper trap width is obtained in the embodiment 2.

Although the above embodiments have been described above by limiting the invention to the color printer, the invention is not limited to such an example. That is, the invention can be also applied to a color multifunction printer and the like.

It should be understood by those skilled in the art that various modifications, combinations, sub-combinations and alterations may occur depending on design requirements and other factors insofar as they are within the scope of the appended claims or the equivalents thereof.

What is claimed is:

1. A color image processing apparatus for performing an overlay process of a plurality of color image data so as to express respective colors, comprising:

a drift information storing portion that stores an amount of drift among the color image data as color drift information;

a boundary detecting portion that determines a portion between a target pixel and a pixel adjacent to the target pixel to be a boundary portion of the color image data when a concentration difference between the target pixel and the adjacent pixel exceeds a preset threshold value; and an image correcting portion that determines whether the boundary portion is a white-on-black portion where no pixel exists or an overlap portion that represents unnecessary overlap by referring to the color drift information stored in the drift information storing portion when the boundary portion is judged, and corrects the color image data by adding, to the white-on-black portion, region image data in which concentrations of the other colors are reduced, and reducing the concentration of the overlap portion.

2. The apparatus according to claim 1, wherein said drift information storing portion stores the presence or absence and a direction of a color drift for another color with respect to each of said plurality of colors.

3. The apparatus according to claim 1, wherein said image correcting portion corrects the image data of the color whose concentration is smallest.

4. The apparatus according to claim 1, wherein said image correcting portion corrects the image data having a wider area among the adjacent color image data.

5. The color image processing apparatus of claim 1, wherein the image correcting portion adds pixels to color image data of the white-on-black portion so as to gradually reduce concentration of the white-on-black portion in a drift direction of the other color image data from the border portion.

6. The color image processing apparatus of claim 1, wherein the image correcting portion gradually reduces concentration of the overlap portion in a drift direction of the other color image data from the border portion.

* * * * *